United States Patent [19]

van Doorn

[11] 3,737,795

[45] June 5, 1973

[54] AMPLIFIER FOR AMPLIFYING AN INPUT SIGNAL DERIVED FROM A SIGNAL SOURCE AND PROVIDED WITH AN AMPLITUDE-LIMITING TWO-TERMINAL NETWORK CONNECTED TO ITS OUTPUT CIRCUIT

[75] Inventor: Willem van Doorn, Hilversum, Netherlands

[73] Assignee: U.S. Philips Corporation, New York, N.Y.

[22] Filed: Nov. 3, 1971

[21] Appl. No.: 195,336

[30] Foreign Application Priority Data

Nov. 10, 1970 Netherlands ........................7016402

[52] U.S. Cl. ........................330/29, 307/237, 330/15

[51] Int. Cl. ................................................H03g 3/30

[58] Field of Search ..................330/29, 15; 307/237; 328/170, 171; 329/134

[56] References Cited

UNITED STATES PATENTS

| | | | |
|---|---|---|---|
| 2,861,185 | 11/1958 | Hopper | 328/171 |
| 3,509,480 | 4/1970 | Hickman | 330/29 X |
| 3,482,134 | 12/1969 | Mann | 309/237 |
| 2,273,771 | 2/1942 | Hunt | 329/134 X |
| 3,209,275 | 9/1965 | Clifton | 328/171 X |

*Primary Examiner*—Roy Lake
*Assistant Examiner*—James B. Mullins
*Attorney*—Frank R. Trifari

[57] ABSTRACT

The invention relates to a limiter for limiting the output signal from an amplifier, for example, a video amplifier, which limiter is provided with an amplitude-limiting two-terminal network and an auxiliary amplifier, a first terminal of the two-terminal network being connected to the signal output lead of the amplifier and a second terminal being connected to an auxiliary signal output lead of the auxiliary amplifier, a signal being derived from said auxiliary amplifier which is in phase opposition with the output signal from the amplifier. The output terminals of the limiter are connected to said first terminal of the two-terminal network and to a terminal of fixed reference potential respectively.

10 Claims, 8 Drawing Figures

Figure 3:
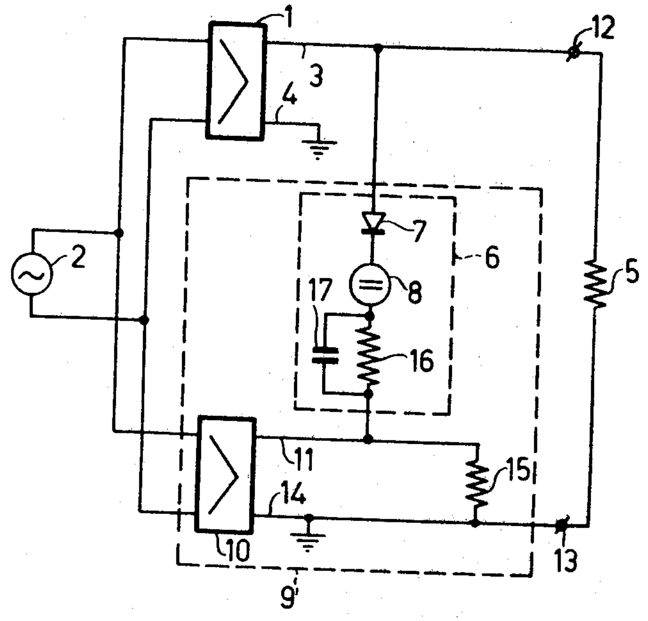

Patented June 5, 1973 3,737,795
4 Sheets-Sheet 1
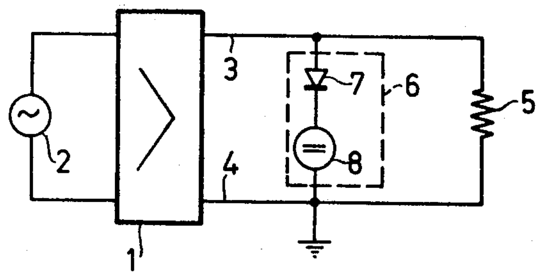
PRIOR ART Fig.1
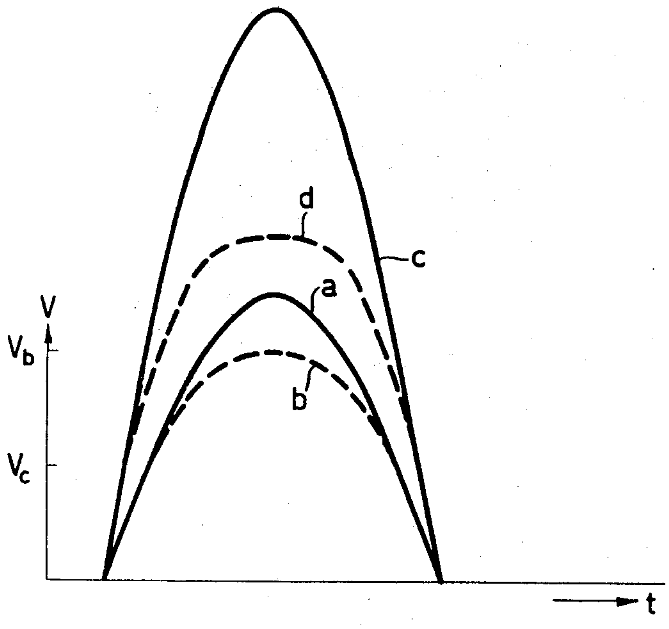
Fig.2
INVENTOR.
WILLEM VAN DOORN
BY
AGENT

WILLEM VAN DOORN INVENTOR.

BY

AGENT

INVENTOR.
WILLEM VAN DOORN
BY
[signature]
AGENT

INVENTOR.
WILLEM VAN DOORN
BY
AGENT

AMPLIFIER FOR AMPLIFYING AN INPUT SIGNAL DERIVED FROM A SIGNAL SOURCE AND PROVIDED WITH AN AMPLITUDE-LIMITING TWO-TERMINAL NETWORK CONNECTED TO ITS OUTPUT CIRCUIT

The invention relates to an amplifier for amplifying an input signal derived from a signal source, and including a limiter connected to the amplifier output circuit for limiting the amplitude of the amplifier output signal if this amplitude exceeds a predetermined value, said limiter comprising an auxiliairy amplifier coupled to the signal source, from which auxiliairy amplifier a signal is derived via an auxiliairy signal output lead, which signal is in phase opposition with the amplifier output signal, and a two-terminal network including a limiting element a first terminal of said network is connected to a signal output lead of the amplifier and a second terminal is connected to the auxiliary signal output lead, the output terminals of the limiter being connected to said first terminal of the two-terminal network and to a terminal of fixed reference potential.

For obtaining an accurately defined level of limitation the amplitude-limiting two-terminal network is to have a very high impedance for amplitudes below the level of limitation and a very low impedance for amplitudes above the level of limitation. In practical embodiments this ideal situation is approximated by a diode which is included as an amplitude-limiting element in the two-terminal network. However, since the transition from a high to a low impedance of the diode is effected gradually, these known embodiments give rise to strong differential amplification and phase distortion; in fact the amplifier output signal is greatly distorted already before the desired level of limitation is reached, and in addition they are unsuitable for limiting signals having low amplitude values.

It is an object of the present invention to provide an amplifier including a limiter connected to the amplifier output circuit of the kind described in the preamble with which is obtained both a very slight differential amplification and phase distortion and a very accurately defined level of limitation, and which in addition is suitable for limiting signals having low amplitude values.

The invention is characterized in that an auxiliary signal derived from the auxiliary amplifier is applied to the junction of the amplitude-limiting two-terminal network and the auxiliary signal output lead, the amplitude of said auxiliary signal being larger than the amplitude of the signal applied to the junction of the amplitude limiting two-terminal network and the signal output lead, a compensation impedance provided with a resistor being included in series with the limiting element in the amplitude-limiting two-terminal network.

In order that the invention may be readily carried into effect, some embodiments thereof will now be described in detail, by way of example with reference to the accompanying diagrammatic drawings, in which FIG. 1 shows an amplifier including an amplitude-limiting two-terminal network incorporated in known manner in the amplifier output circuit while the limiting action is illustrated by a time diagram in FIG. 2.

Figure 4:
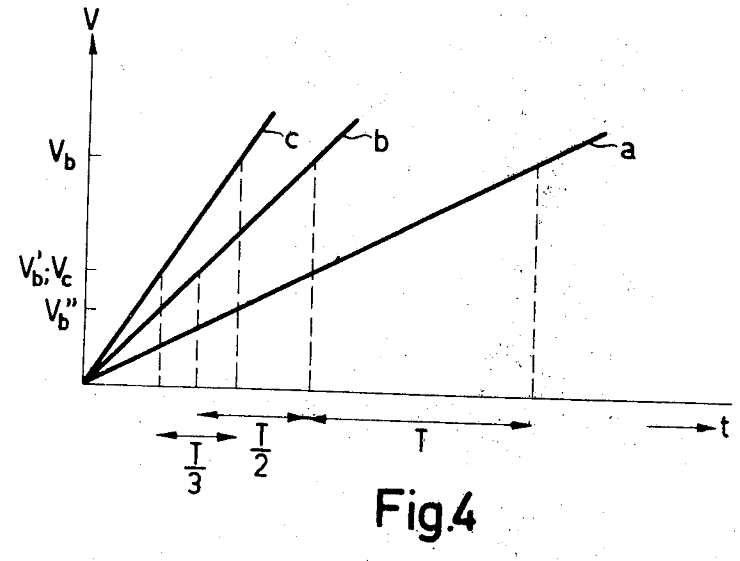
Figure 5A:
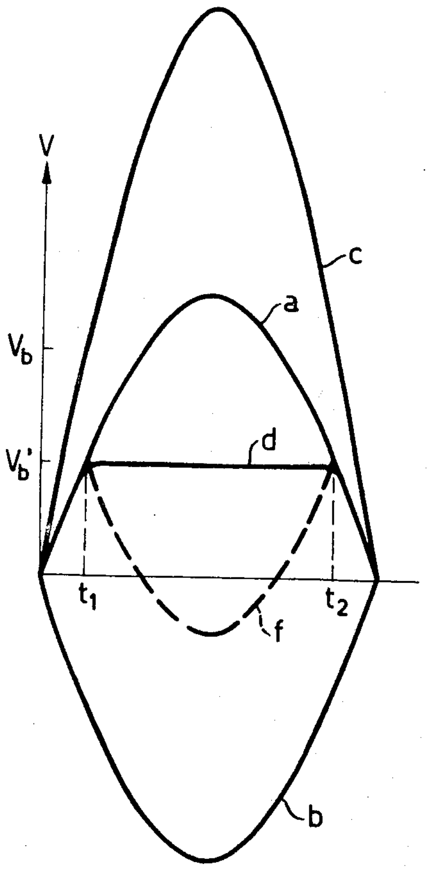
Figure 5B:
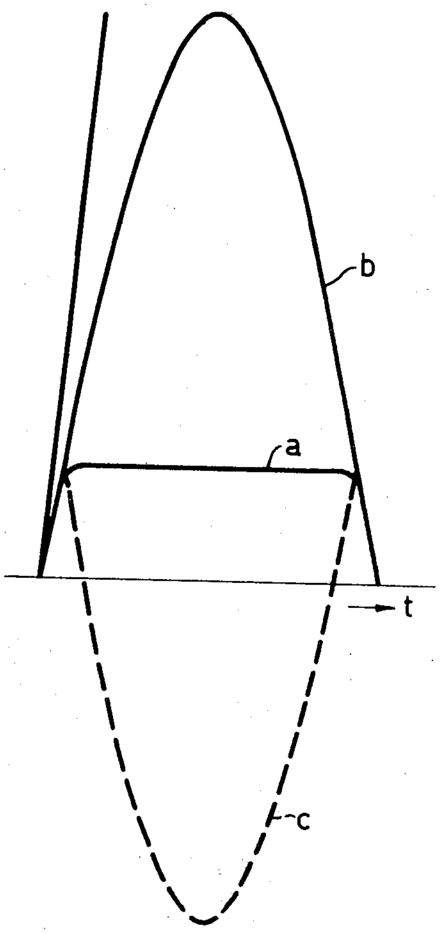
Figure 5C:
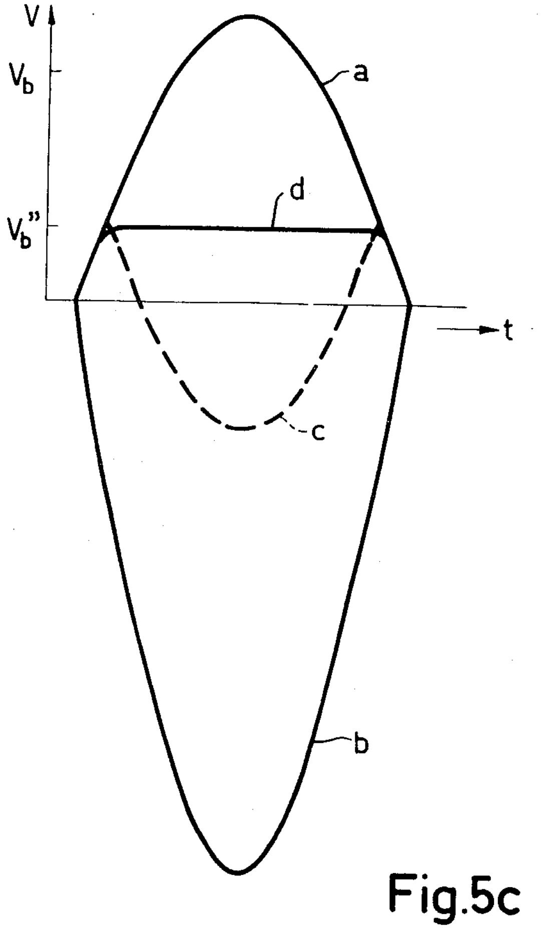
Figure 6:
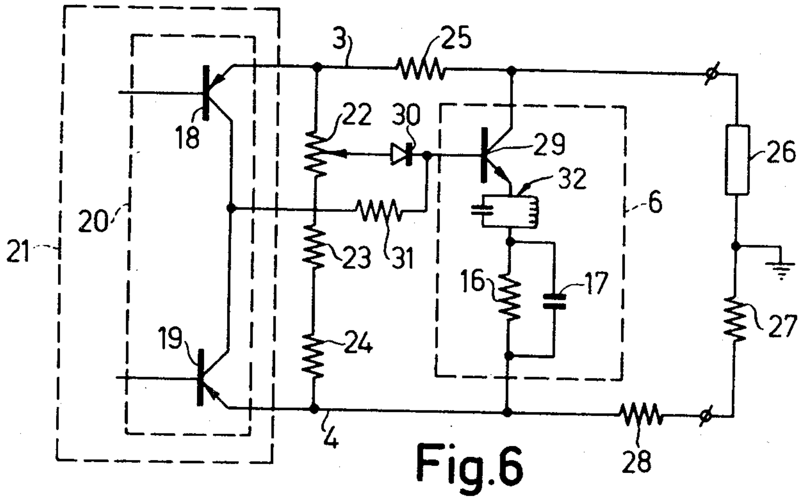

FIG. 3 shows a principal structure of the arrangement according to the invention, while FIGS. 4 and 5 show a few time diagrams so as to explain the arrangement of FIG. 3, FIG. 6 shows a practical embodiment of the arrangement according to the invention.

FIG. 1 diagrammatically shows an amplifier 1 for amplifying an input signal derived from a signal source 2 in the form of a voltage source and provided with output terminals 3, 4, the terminal 4 having a fixed reference potential, i.e. earth potential in this embodiment. For a maximum energy transmission the amplifier is terminated by a characteristic resistor 5.

To limit the amplitude of the output signal from amplifier 1 at a previously determined fixed level of limitation of, for example, $V_b$ volt, an amplitude-limiting two-terminal network 6 provided with a limiting element 7 formed as a diode is connected in known manner to the output terminals 3, 4 of amplifier 1. To determine the level of limitation, two-terminal network 6 includes a direct voltage source 8 in series with diode 7. The limiting action of two-terminal network 6 is illustrated by a time diagram in FIG. 2. In this Figure the curve *a* represents the non-limited output signal from amplifier 1, which output signal has the variation shown by curve *b* after limitation. As curve *b* shows, this known arrangement has a high differential amplification distortion owing to the non-ideal diode characteristic. As a result, the impedance of diode 7 in the pass direction gradually decreases from a voltage $V_c$ across two-terminal network 6 until this impedance has a minimum value for the limitation voltage $V_b$, which value is, however, not infinitely low. The output signal from amplifier 1 is thereby already distorted on the one hand before the level of limitation $V_b$ is reached, while on the other hand a uniform level of limitation is not obtained which is illustrated by curve *d* in FIG. 2. In fact, curve *d* represents the limited signal which is obtained by limitation of the output signal from amplifier 1 represented by curve *c* while the amplitude of this output signal is larger than that of the output signal *a*, i.e. twice as large in this time diagram.

FIG. 3 shows an arrangement according to the invention in which the elements corresponding to those in FIG. 1 have the same reference numerals. Also in this embodiment the two-terminal network 6 is constituted by a diode 7 in series with the direct voltage source 8.

In order to reduce the above-mentioned differential amplification distortion to a large extent, the amplitude-limiting two-terminal network 6 according to the invention forms part of a limiter 9 which is provided with an auxiliary amplifier 10 coupled to the signal source 2, from which amplifier a signal is derived through an auxiliary signal output lead 11, which signal is in phase opposition with the output signal from the amplifier 1, while a first terminal of the two-terminal network 6 is connected to the signal output lead 3 of amplifier 1 and a second terminal is connected to the auxiliary signal output lead 11 of auxiliary amplifier 10. The output terminals 12, 13 of limiter 9 are connected to said first terminal of two-terminal network 6 and to a terminal having a fixed reference potential, respectively, i.e. earth potential in this embodiment.

In the embodiment shown the auxiliary amplifier 10 is terminated by its characteristic resistor 15, which has the same value as the characteristic resistor 5 of amplifier 1 connected to terminals 12, 13 while terminal 14 of the auxiliary amplifier likewise has earth potential.

By using the steps according to the invention, it is achieved on the one hand that the differential amplification distortion is reduced to a great extent and on the other hand a very accurately defined limitation of the output signal from amplifier 1 is realized in a manner which more particularly makes it possible to limit signals having low amplitudes that is to say, amplitudes which are only slightly higher than the level of limitation $V_b$, while limitation is also possible at a level which is lower than the level of limitation inherently determined by the elements used (particularly diode 7). Particularly the voltage across diode 7 is not determined by the output voltage from amplifier 1, as is the case in the known arrangement, but by the sum of the absolute values of the output voltages of amplifier 1 and auxiliary amplifier 10, so that the time during which the voltage across two-terminal network 6 increases from $V_c$ to $V_b$ is shorter than in the known arrangement. In addition, the output signal of amplifier 1 is limited by compensation thereof by the output signal of auxiliary amplifier 10. All this is further illustrated with reference to the time diagrams of FIGS. 4 and 5.

In FIG. 4, line *a* diagrammatically shows the amplitude of the output signal U of amplifier 1 as a function of time in the range of from 0 $\leq$ U to U $\approx V_b$. As in FIG. 2, $V_c$ and $V_b$ represent the voltage across two-terminal network 6 in which the diode becomes conducting in the pass direction and is fully conducting, respectively. The time during which the output voltage of amplifier 1 increases from $V_c$ to $V_b$ is T sec. during which time the strong differential amplification distortion as shown in FIG. 2 occurs in the arrangement of FIG. 1.

Line *b* in FIG. 4 shows as a function of time the voltage variation across the two-terminal network 6 of FIG. 3 when the amplitudes of the output signals from amplifier 1 and auxiliary amplifier 10 are equal. As a result the slope of line *b* is twice as large as that of line *a*, so that within a period of only T/2 sec. the voltage across diode 7 increases from $V_c$ to $V_b$ which period is only T/3 sec. when the amplitudes of the output signals from amplifier 1 and auxiliary amplifier 10 have a ratio of 1 : 2 (compare line *c* in FIG. 4).

As is apparent from the foregoing, an accelerated adjustment of two-terminal network 6 at the limitation voltage $V_b$ is realized by using auxiliary amplifier 10, so that the differential amplification distortion of the output signal from amplifier 1 is reduced to a great extent. FIG. 4 also shows that if the control voltage across two-terminal network 6 has an amplitude which is larger than that of the signal to be limited, this signal is already limited if it has an instantaneous value below the level of limitation $V_b$. As is shown, for example, the output signal from amplifier 1 (line *a*) is limited at a voltage $V'_b = V_b/2$ for a control voltage according to line *b*, and at a voltage $V''_b = V_b/3$ for a control voltage according to the line *c*. By modifying the voltage of direct voltage source 8, the level of limitation may be adjusted at any desired value.

To explain the limiting action of the arrangement shown in FIG. 3, the non-limited output signal from amplifier 1 in the time diagram of FIG. 5*a* is represented by curve *a*, while curves *b* and *c* represent the output signal from auxiliary amplifier 10 and the control signal across two-terminal network 6 respectively. The voltage values $V_b$ and $V'_b$ in this Figure have the same significance as in FIGS. 2 and 4, respectively, while the amplitude of the signal according to curve *a* is equal to that according to curve *a* of FIG. 2.

On the one hand the output signal from amplifier 1 is applied to resistor 5 in the arrangement of FIG. 3 from a voltage value $V_b$ of the control voltage and on the other hand the output signal from auxiliary amplifier 10 is applied so that for a control voltage $\geq V_b$ the instantaneous values of the output voltages of amplifier 1 (curve *a*) and auxiliary amplifier 10 (curve b) across resistor 5 are algebraically added. Voltage values $\geq V'_b$ in the output signal from amplifier 1 are compensated for in this manner by the output signal from auxiliary amplifier 10, so that in case of equal amplitudes of the two output signals, as shown in FIG. 5*a*, the peak of the output signal from amplifier 1 is cut off straight and at the level $V'_b$ whereby the limited signal according to curve *d* is obtained. The compensating output voltage of auxiliary amplifier 10 is shown by curve *f* in this FIG. 5a.

Curve *a* in FIG. 5b shows the limited output signal which results from the non-limited output signal from amplifier 1 represented by curve *b* and which non-limited output signal has an amplitude which is equal to the amplitude of the signal according to curve *c* of FIG. 2. The compensating output voltage of amplifier 10 is represented by curve *c* in FIG. 5*b*. As may be apparent from a comparison of the time diagrams of FIG. 2 and the time diagrams of FIGS. 5*a* and 5*b*, the steps according to the invention lead to an accurately defined level of limitation together with a considerable reduction of the differential amplification distortion. In this case not only a considerable reduction of the differential amplification distortion and an accurately defined level of limitation is realized, but it is also found that the limitation is to a large extent independent of the amplitude of the output signal from amplifier 1 to be limited (compare curve *d* of FIG. 2 with curve *a* of FIG. 5*b*).

A still more accurate limitation is obtained by rendering the amplitude of the output signal from auxiliary amplifier 10 larger than that of the output signal from amplifier 1, for example, by a factor of 2. In this case even overcompensation of the signal to be limited occurs so that, for example, in the limitation interval $t_1 - t_2$ of FIG. 5a the limited signal decreases to below the level of limitation $V'_b$. During this interval the limited signal may even assume negative values. This overcompensation may be suppressed in a simple manner by incorporating a suitable proportioned resistor 16 in series with the amplitude-limiting element 7. Resistor 16 also effects a considerable linearisation of the differential resistance of the amplitude-limiting element 7, so that a further reduction of the differential distortion is obtained.

FIG. 5c further illustrates the above-mentioned overcompensation and the action of resistor 16 suppressing this overcompensation. In this Figure curves *a* and *b* represent the output signals from amplifier 1 and auxiliary amplifier 10, respectively the amplitude of signal *b* being twice as large as that of signal *a*. The overcompensation thus occurring is denoted by curve c. After suppression of this overcompensation by resistor 16, the very accurately limited output signal is obtained which is represented by curve *d*.

In order to prevent distortions owing to parasitic impedances of the limiting element 7 when limiting signals of high frequencies or broad frequency bands, a compensation impedance is incorporated in the two-terminal network 6 according to a further aspect of the invention. This compensation impedance may advantageously be constituted by a capacitor 17 which shunts resistor 16 in the two-terminal network.

FIG. 6 shows a practical embodiment of an arrangement according to the invention in which the amplifier is provided with a transistor 18 and the auxiliary amplifier is provided with a transistor 19, which transistor 18, 19 constitute a push-pull final amplifier stage 20 of a video amplifier 21 not further shown. The emitters of these transistors 18 and 19 are connected together through a series arrangement of resistors 22, 23, 24, and for adaptation of this final amplifier in the circuit arrangement they are also connected through a series arrangement of mutually equal resistors 25, 26, 27, 28, resistor 26 being constituted, for example, by the input resistor of a modulator connected to the output circuit of amplifier 1. The junction of resistors 26 and 27 has a fixed potential, i.e. earth potential and the output signal from the amplifier is derived across resistor 26.

In this embodiment the amplitude-limiting two-terminal network 6 is connected at one end through resistor 25 to the emitter of transistor 18, and at the other end directly to the emitter of transistor 19, so that the favorable control voltage according to line *c* of FIG. 4 is present across this two-terminal network 6. However, this amplitude-limiting two-terminal network 6 differs from that of FIG. 3 in that the limiting element is constituted by a transistor 29 which for the purpose of limitation of positive signal values is of the npn-type. By using a transistor as a limiting element, the important advantage is obtained that on the one hand any desired level of limitation can be adjusted in a simple manner without using the direct voltage source 8 shown in FIG. 3, and on the other hand a further reduction of the differential amplification and phase distortion is realized. To this end the base electrode of transistor 29 is connected to the resistor 22 formed as an adjustable resistor. As a result, a direct voltage determining the level of limitation is applied to the base electrode on the one hand and on the other hand a control voltage is applied the shape of which is equal to the shape of the control voltage across two-terminal network 6 so that the time elapsing between opening and full conductance of transistor 29 is still further reduced.

A more accurate limitation is obtained by applying an amplified control voltage to the base of transistor 29.

To compensate for variations in $V_{be}$ of the transistor as a result of temperature fluctuations, a diode 30 is connected in known manner in series with the base of transistor 29 and this base is connected through a resistor 31 to the collectors of transistors 18, 19.

If a given frequency, for example, the chrominance sub-carrier of the video signal is to be excluded from limitation, this may be effected in a simple manner by incorporating a parallel resonant circuit 32 in series with the emitter of transistor 29, which resonant circuit consists of a capacitor and an inductor which is adjusted at the frequency to be excluded.

It is to be noted that for limiting the negative signal values, the same arrangement may be used as is shown in FIG. 6, but then transistor 29 is to be of the pnp-type.

For the arrangement of FIG. 6 which was extensively tested in practice for limiting amplitude values of 1.5 V at a maximum at a level of 0.5 V, the composite components have the following values:

Resistor 20—220 ohms
resistor 21—1180 ohms
resistor 22—1.4 k.ohms
resistors 23, 24, 25, 26—75 ohms
resistor 16—110 ohms
resistor 31—9 k.ohms
Diode 28—BAX 13
Transistor 27—BFY 90
Capacitor 17—56 pF.

while the voltage at the junction of the collectors of transistors 18 and 19 is − 6 Volts, and at the junction of resistors 23 and 24 is +18 Volts.

What is claimed is:

1. An amplifier for amplifying an input signal derived from a signal source, and including a limiter connected to the amplifier output circuit for limiting the amplitude of the amplifier output signal if this amplitude exceeds a predetermined value, said limiter comprising an auxiliary amplifier coupled to the signal source, from which auxiliary amplifier a signal is derived via an auxiliary signal output lead which signal is in phase opposition with the amplifier output signal, and a two-terminal network including a limiting element a first terminal of said network is connected to a signal output lead of the amplifier and a second terminal is connected to the auxiliary signal output lead, the output terminals of the limiter being connected to said first terminal of the two-terminal network and to a terminal of fixed reference potential, characterized in that an auxiliary signal derived from the auxiliary amplifier is applied to the junction of the amplitude limiting two-terminal network and the auxiliary signal output lead, the amplitude of said auxiliary signal being larger than the amplitude of the signal applied to the junction of the amplitude-limiting two-terminal network and the signal output lead, a compensation impedance provided with a resistor being included in series with the limiting element in the amplitude-limiting two-terminal network.

2. An amplifier as claimed in claim 1 characterized in that said compensation impedance for the purpose of compensating for the parasitic impedance of the limiting element is constituted by a capacitor which shunts the resistor in series with the limiting element.

3. An amplifier as claimed in claim 1, characterized in that the limiting element is constituted by the collector-emitter path of a transistor whose base electrode is connected to the output circuit of the amplifier.

4. An amplifier as claimed in claim 1, characterized in that the amplitude-limiting two-terminal network is provided with a resonant circuit for excluding limitation of the output signal from the amplifier whose frequency corresponds to the resonant frequency of the resonant circuit.

5. A circuit comprising first and second amplifiers each having an input means for receiving the same input signal and an output means for providing first and second output signals, said second output signal having a phase opposite with respect to the phase of said first output signal and an amplitude greater than the amplitude of said first output signal; means for limiting said first output signal comprising a series circuit coupled between said first and second outputs, said series circuit comprising a limiting element having an imperfect limiting characteristic, a source of fixed potential coupled to said element and means for compensating for said imperfect characteristic including a resistor coupled in said series circuit.

6. A circuit as claimed in claim 5 wherein said compensating means further comprises a capacitor parallel coupled to said resistor, whereby parasitic impedance of said limiting element is compensated.

7. A circuit as claimed in claim 5 wherein said limiting means comprises a transistor having emiter, base, and collector electrodes, said limiting element comprising the collector-emitter path of said transistor, said base being coupled to said fixed potential source.

8. A circuit as claimed in claim 7 wherein said first and second amplifying means together comprising a push-pull amplifier and said fixed potential source comprises a potential divider coupled across said first and second outputs of said push-pull amplifier.

9. A circuit as claimed in claim 5 wherein said series circuit further comprises a parallel tuned circuit means for excluding from the limitation action of said limiting element a signal of a selected frequency.

10. A circuit as claimed in claim 7 further comprising a temperature compensating diode coupled between said base and said first output means.

* * * * *